Oct. 3, 1950

R. HENDERSON 2,524,704

CARD INDEXING DEVICE

Filed April 26, 1947

3 Sheets-Sheet 1

INVENTOR

Robert Henderson

CARD INDEXING DEVICE

Filed April 26, 1947 3 Sheets-Sheet 2

INVENTOR

Robert Henderson

Oct. 3, 1950 R. HENDERSON 2,524,704

CARD INDEXING DEVICE

Filed April 26, 1947 3 Sheets-Sheet 3

INVENTOR

Robert Henderson

Patented Oct. 3, 1950

2,524,704

UNITED STATES PATENT OFFICE 2,524,704

CARD INDEXING DEVICE

Robert Henderson, Summit, N. J.

Application April 26, 1947, Serial No. 744,049

11 Claims. (Cl. 40—104)

The present invention relates to improvements in card indexing devices and more particularly to such devices wherein manually operable mechanical means are provided for selectively opening to view a predetermined one of a number of cards or leaves.

Although this invention may be employed with respect to a plurality of cards disposed in any desired orderly arrangement, as for example, in alphabetical or numerical order or in order by dates, etc., it is disclosed and described herein, for illustrative purposes, with respect to an alphabetically arranged card index of names and telephone numbers. It is believed that an understanding of this particular embodiment of the invention will enable one to understand the manner in which it may be employed with respect to other indexing arrangements of cards or leaves. The following statement of objects inferentially indicates certain shortcomings of prior indexing devices which are remedied by the present invention.

One object of this invention is the provision of an indexing device such as a telephone index wherein a selected one of plural orderly-arranged cards may be opened to view more readily than in prior indexing devices.

Another object is the provision of such an indexing device wherein a selected card is opened to view by the simple manipulation of a single element as, for example, by merely pressing a key, rather than by manipulating two or more elements as in prior indexing devices.

Another object is the provision of such an indexing device wherein its operation, substantially in its entirety, is by downward movement of a key or keys, thereby avoiding any tendency of the device to slide around on a desk or table on which it rests, as usually occurs in the operation of prior devices in which a card selecting member must be moved horizontally against some frictional or spring resistance.

Another object is the provision of such an indexing device wherein, after a selected card has been opened to view, the device may be closed by the manipulation of a single element as, for example, by merely pressing a key.

Another object is the provision of such an indexing device in which pivot mounting of parts thereof is substantially avoided whereby to minimize the cost of manufacturing the device.

Another object is the provision of such an indexing device, the parts of which may be produced and assembled very economically.

Another object is the provision of such an indexing device wherein the parts thereof are so arranged as to permit a compact and attractive association therewith of other useful devices such as, for example, a calendar and a scratch paper holder.

Another object is the provision of such an indexing device wherein the cards therein may be instantaneously removed or replaced, either separately or in a group, thereby facilitating entry of new names and telephone numbers or other information thereon.

Another object is the provision of such an indexing device wherein keys coact with an inclined plane for opening and closing the device.

Another object is the provision of plural cards or leaves, for such an indexing device, which have an improved arrangement of tab or selecting portions, facilitating selective opening of any one of said cards to view, and also have special means for spacing the faces of each card from the faces of each adjacent card.

Another object is the provision, in such a device, of improved means for spring-biasing a plurality of card selecting elements or actuators in their normal positions.

The foregoing and other objects and advantages are accomplished by the present invention of which an illustrative embodiment thereof, in the form of a telephone index, is illustrated in the accompanying drawings in which.

Figure 1:
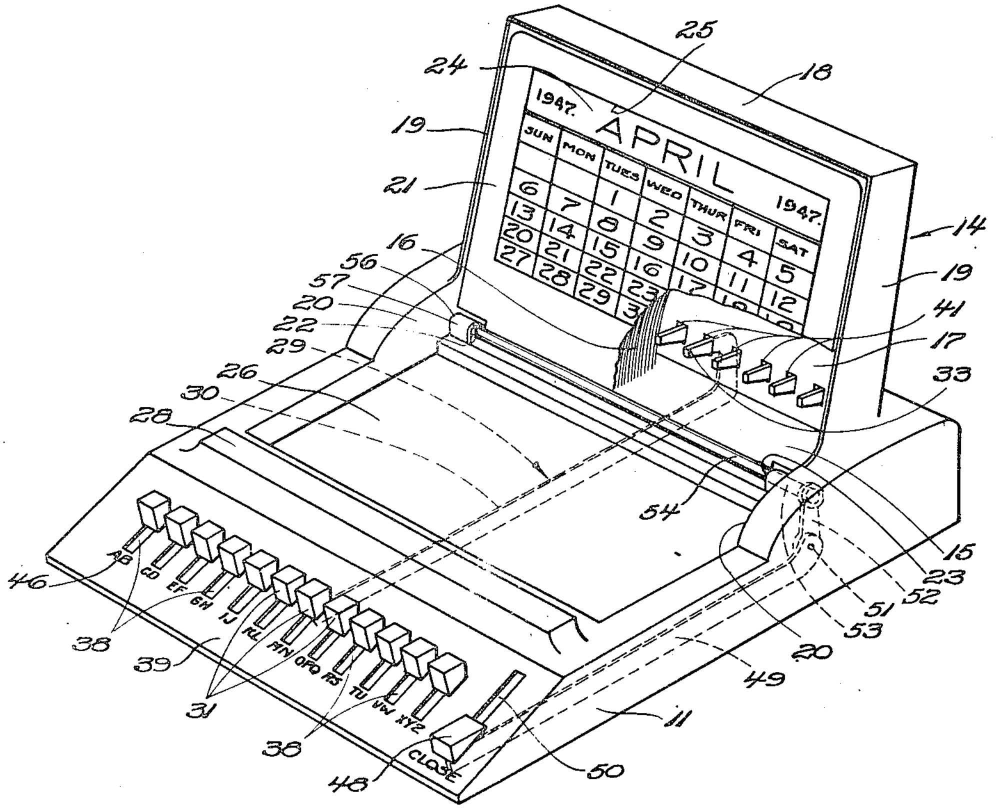
Figure 1 is a perspective view of an indexing device embodying this invention, several elements thereof being shown in broken lines and a portion being broken away to clarify the relationship of various parts of the device.

The telephone index, illustrated in the drawings as one of various structures in which the present invention may be employed, comprises a rigid, generally rectangular base 11 with a flat bottom 12 preferably covered with felt or having thin soft rubber feet 13 to protect the surface of a desk or table upon which the device rests. A rigid, substantially upright card or leaf holder 14 is disposed at the rear of the device and may be formed integrally with or rigidly fixed to the base 11.

The leaf holder 14 has a bottom 15 for supporting, at their bottom edges, a plurality of leaves in the form of cards 16, in the present instance twelve in number, and a back 17 for holding the cards normally in a suitable substantially upright angular attitude. The leaf holder also has a top flange 18 to cover the cards when the device is closed, and side flanges 19 with forwardly extending guides 20 at their lower ends for keeping the cards in substantial alignment in all operative conditions of the device.

The leaf holder 14 also has a flat substantially rigid front closure cover 21, approximately the size of the cards 16, and pivoted at its bottom corners to the base 11 as at 22 and 23. The cover 21 may carry a replaceable calendar card 24 which may be mounted in any suitable manner as, for example, by providing a face opening 25 to receive the calendar card therein, suitable means (not shown) being provided for holding the calendar card in its desired visible position. Reserve calendar cards of a set may be kept in a pocket 17a formed upon the rear face of the back 17 of the card holder.

The base 11 is hollowed and shaped substantially as shown in the drawings to provide portions for accommodating and coacting with certain operating elements all as hereinafter described. Forwardly of the card holder 14, the base 11 is formed with a shallow rectangular trough 26 for holding a scratch pad or some sheets of scratch paper 27 therein. The paper 27 is in view and accessible for inscribing memoranda thereon at all times except when the device is open as hereinafter described. The base 11 also is formed to provide a cross-wisely extending hand support 28 to make it more convenient for one to write upon the scratch paper in the trough.

Figures 2, 3:
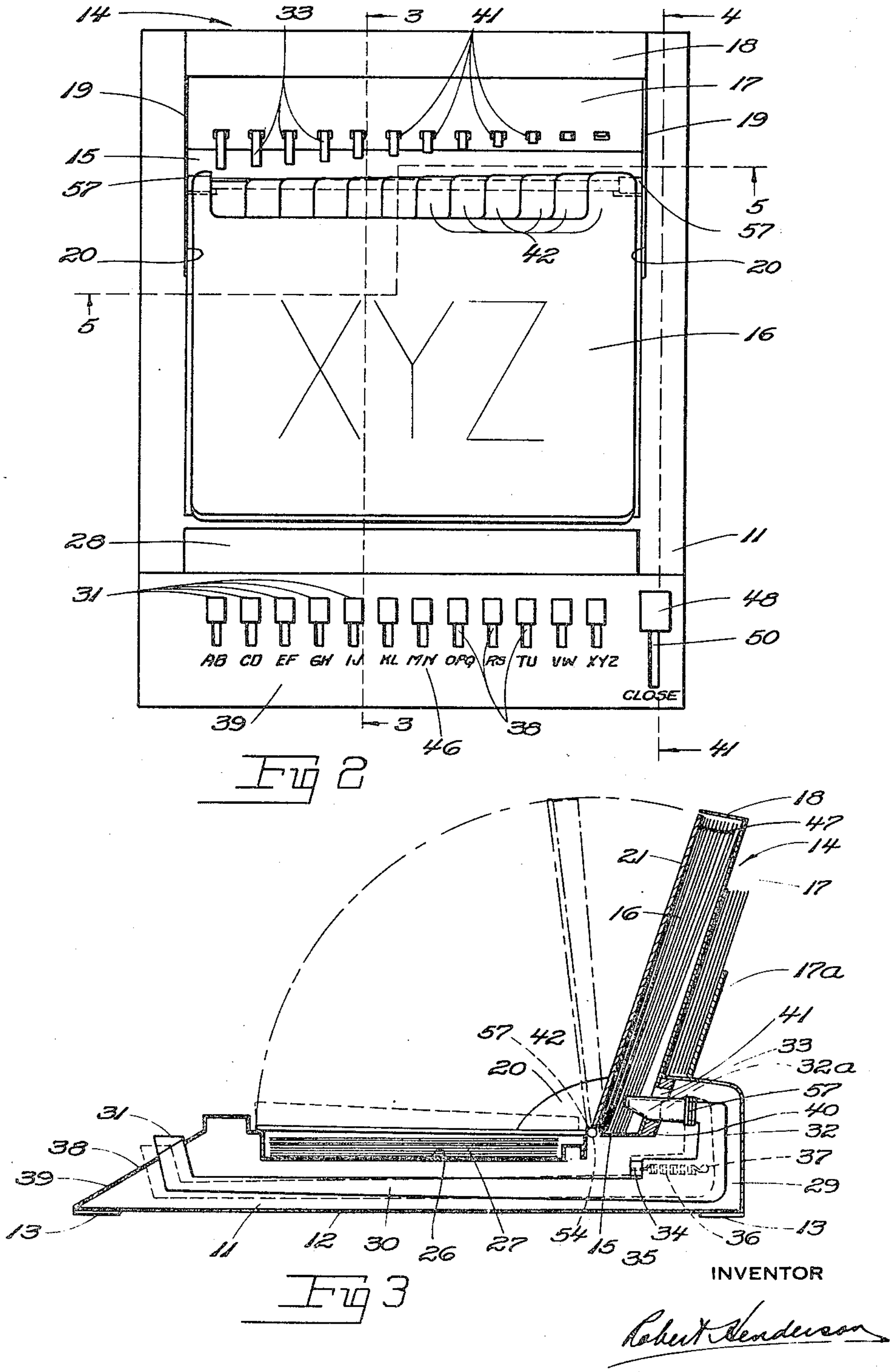
Fig. 2 is a plan view of the device, all the cards therein being shown in open position to bring into view certain portions of card selecting elements or actuators. In some subsequent views related to this view however, the cards are shown in various other positions.
Fig. 3 is a central vertical front to back sectional view taken substantially on the line 3—3 of Fig. 2, the device being shown as closed.

The device may be considered as being closed when all the cards 16 and the pivoted closure cover 21 are in their substantially upright but somewhat angular attitudes as shown in full lines in Fig. 3 and may be considered as being open when the said cover 21 and one or more of the cards 16 have been pivotally moved, as indicated by the broken arcuate line in said figure to their substantially horizontal positions shown therein in regular broken lines. Means as hereinafter described are provided for opening and closing the device.

The mentioned opening means preferably comprise a plurality of substantially similar leaf or card actuators 29, one related to each card and each having, as best seen in Fig. 3, a shank 30 extending underneath the trough 26 substantially from the front to the rear of the device, a key 31 integral with or fixed to the front end of said shank, an upwardly extending neck 32 integral with or rigidly fixed to the rear end of said shank and a forwardly extending pusher finger 33 rigidly fixed to the upper end of the neck 32.

Figure 5:
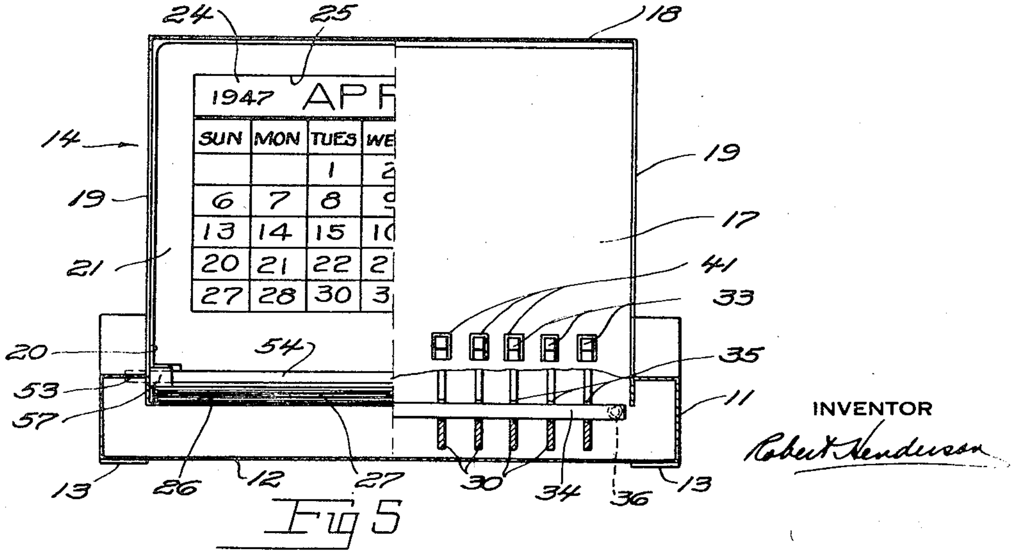
Fig. 5 is an offset side to side sectional view taken substantially on the irregular line 5—5 of Fig. 2, the device being shown as closed in the left half and the cards being omitted in the right half for clearness.

The card actuators 29 are preferably arranged in side by side relationship and are held yieldably in their rearmost positions by a spring-biased floating, rigid crossbar 34. This crossbar, as best seen in Figs. 3 and 5, rests upon the shanks 30 of all the card actuators and normally is yieldably held against shoulders 35 on all said card actuators by a pair of light-tension springs 36 anchored to and tensioned between opposite ends of the floating crossbar 34 and more-rearward points 37 on the base 11. Other equivalent spring arrangements could be employed if desired. Obviously, the crossbar 34 is carried forward somewhat, usually in a slightly angular movement, by the forward movement of any one of the card actuators 29 and when the latter is free to move back again, the springs 36 acting through the crossbar 34 will move it back to its normal rearmost position.

A plurality of similar forwardly to rearwardly extending slots 38 are formed in an inclined-plane front portion 39 of the base 11, one of such slots being provided for each card actuator 29. The shanks 30 of the card actuators are relatively thin and their forward ends extend with a close but nevertheless free sliding fit through their respective slots 38. The keys 31 are thicker than the shanks 30 and wider than the slots 38; hence, they rest upon the inclined-plane portion 39 to support the forward ends of their respective card actuators.

The slots 38 are longer than the width of the portions of the shanks 30 extending therethrough, therefore, when a key 31 is manually pressed vertically downwardly, it slides down the inclined-plane portion 39, carrying its related card actuator 29 forwardly from its full line position to its broken line position as shown in Fig. 3. When released, the springs 36 acting through the crossbar 34 pull the card actuator back to its rearmost position, the key of that actuator, of course, sliding back to its uppermost position in its related slot 38.

The rear ends of the card actuators 29 rest upon a support 40 (Fig. 3) which may be fixed to or formed integrally with the back 17 of the card holder. The support 40 and the back 17 are provided with separate substantially vertical guide slots 41 for each card actuator and the fingers 33 of the card actuators extend substantially horizontally through said slots, being supported by the bottom confines of the latter at such a level that when any one of the card actuators is moved forwardly by depression of its related key, the tip of its finger 33 engages a bottom marginal selecting portion 42 of a related card 16 a short distance above its lower edge, said finger, however, avoiding contact with other more rearwardly disposed cards because of the distinctive selecting portion design of each card as hereinafter more fully described.

As the lower edges of the cards are substantially restrained by the lower portion of the cover 21 against material forward movement, the finger 33, when moved forwardly, pushes its said related card forwardly in a pivotal movement, carrying with it all cards disposed forwardly thereof as well as the cover 21. This forward horizontal movement of the finger 33 need only be sufficient to carry the pushed cards 16 and the cover 21 leftwardly slightly beyond vertical to about the positions thereof shown in Fig. 3 in irregular broken lines, after which the pushed cards and cover will pivot leftwardly by gravity to their substantially horizontal positions as shown in regular broken lines in said figure. This operation leaves, substantially upright in their normal positions, all cards which normally are disposed rearwardly of said pushed cards. Thus the back of the card engaged and pushed by the finger 33 and the front of the next succeeding card are opened to view together with the names and telephone numbers or other inscriptions thereon.

In the illustrated device, twelve cards 16 are provided, and, utilizing each face of each card for listing names beginning with a different letter of the alphabet, the twelve cards may serve as an alphabetical index of a sizable list of names and telephone numbers or other information related to each name.

Figures 4, 6:
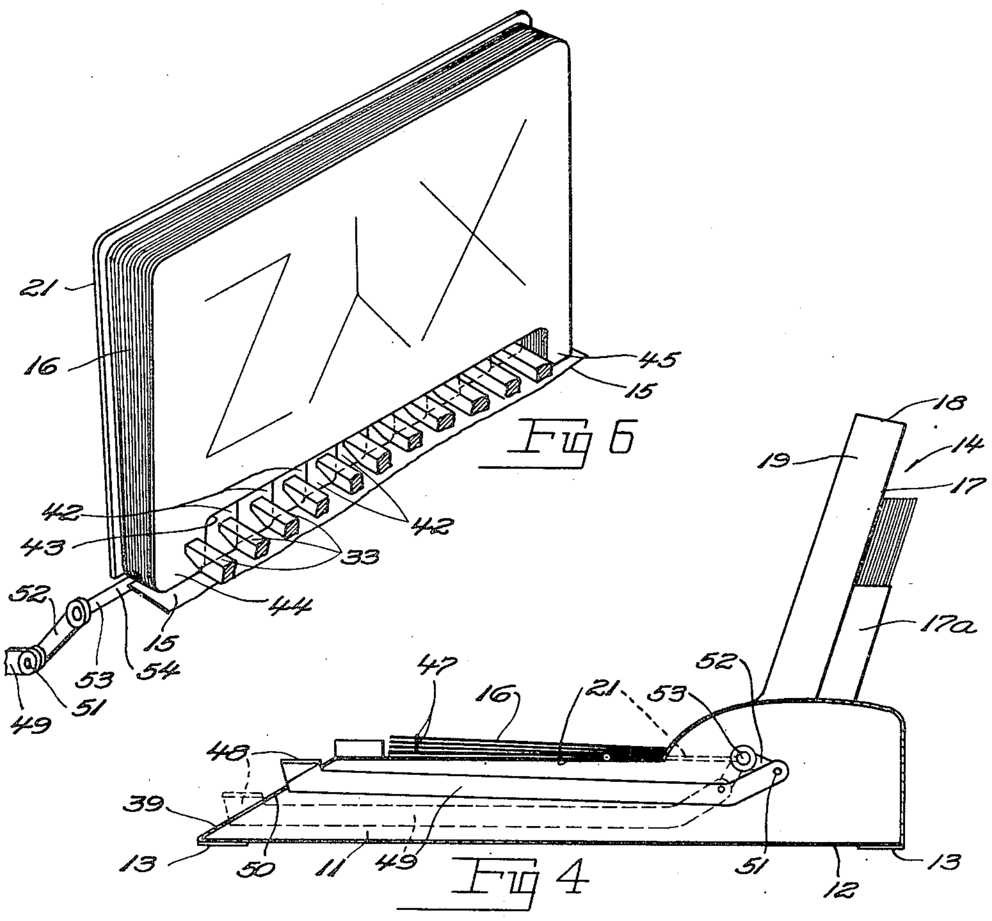
Fig. 4 is a vertical front to back sectional view taken substantially on the line 4—4 of Fig. 2.
Fig. 6 is a rear perspective view of an assembled closed set of cards suitable for use in or as a part of the device, including fragmentary portions of certain adjacent parts of the device.

The relationship of the selecting portions 42 on the several cards and the fingers 33 of the card actuators yielding the described selective opening of the device probably can best be understood from Fig. 6. In that figure, the card holder 14 is omitted and the cards 16 are shown in their normal upright positions, as viewed from the rear. The first card, being the one immediately adjacent the cover 21, has a straight unbroken bottom edge; but the following cards are notched out along their bottom marginal portions, the notches in each succeeding card being somewhat longer, with the notch 43 in the last card extending across the greater portion of the card and leaving only lower end portions 44 and 45 for supporting said card, at its opposite ends, upon the bottom 15 of the card holder.

The described notching of the various cards provides the selecting portions 42 at various bottom marginal points on the several cards and leaves the said selecting portion of each card accessible for engagement by a separate finger 33 so that any selected card may be pushed forwardly to open the cards at that point by merely depressing the key 31 of the card actuator 29 related to that card.

Suitable alphabetical indicia 46 may be printed upon the incline 39 in relation to the keys 31 or, if desired, such indicia may be printed upon the tops of said keys, thus enabling an operator to select the proper key to be pressed to open the device at a desired place in the card pack.

With respect to entries on the cards, the notched edge is considered as the bottom of the front of the card and as the top of the back of the card. The cards preferably should be moderately stiff to enable them to be actuated in the manner described herein.

All the cards 16, excepting possibly the first or last card of the pack, preferably are dimpled in several places near the top edges thereof as at 47 (Figs. 3 and 4) with the dimpling on various cards sufficiently offset or out of register so that the dimples formed in one card will not nest in the dimples of adjacent cards. This dimpling serves to space the cards apart slightly to avoid air-lock between them so that when one card is intentionally pushed forwardly in operation there will not be sufficient suction between it and the next succeeding card to cause the latter to unintendedly be carried forwardly.

Means for closing the device may comprise, as best shown in Fig. 4, a thickened key 48 fixed to the forward end of a relatively thin cover actuator rod 49 which extends in a close but a free-sliding fit through an elongated slot 50 formed in the incline 39 and is pivotally connected at its rear end at 51 to the lower end of a crank or pitman 52 which is fixed at its upper end to one of opposite end extensions 53 of a horizontal rod 54. The rod 54 is fixed to the bottom of the cover 21 and its said extensions 53 constitute the journals by which said cover is pivotally supported in suitable apertures 55 in internal webs 56 of the base 11, one of said apertures and webs being visible in Fig. 5.

When the device is open the key 48 is in its uppermost position overlying the upper end of the slot 50 as shown in full lines in Fig. 4. To close the device, the key 48 is pressed and travels down the inclined plane 39, carrying the rod 49 forwardly as indicated in broken lines in said figure, and moving the cover 21, with any cards resting thereon, pivotally upwardly to their closed positions. It is of interest on the matter of economy of production to note that the pivot mounting of the cover 21 and the connection 51 of the rod 49 and the pitman 52 are the only pivot structures in the device.

In order to assure that none of the cards 16 may drop down between the front edge of the bottom 15 of the card holder and the bottom edge of the closure cover 21 of the card holder, the said bottom 15 may have U-shaped tongues 57 fixed to its front edge at each side thereof and extending upwardly and forwardly substantially over the adjacent portion of the rod 54.

It should be observed from Fig. 2 that the fingers 33 toward one side of the device extend forwardly somewhat more than those at the opposite side of the device. Theoretically, the forward extension of these fingers should increase progressively from one side of the device to the other to allow for the fact that the selecting portions 42 of the various cards normally are somewhat differently spaced from the back 17 of the card holder. In practice, however, this theory need not be precisely observed, but instead it may suffice for one group of say three fingers 33 toward the right side of the device to extend forwardly only a relatively short distance, and the succeeding groups each of three fingers to be arranged to extend progressively greater distances forwardly with the three fingers at the left side of the device extending forwardly the farthest of all.

In order to be able to form all parts of the several card actuators 29 including the fingers 33 exactly alike to minimize production costs while nevertheless enabling the fingers 33 to protrude forwardly to different extents as explained in the next preceding paragraph, the fingers 33 may be in the form of identical hollow caps which may fit with a rather close friction fit upon a short, forwardly extending stub 32a of the neck 32, as best seen in Fig. 3. Then the effective forward extension of the finger 33 may be made more on some card actuators than on others by placing one or more thin washers 57 on the stub 32a before pushing the finger 33 into place thereon. Proper variation of the number of such washers so used should yield the proper variation in the forward extension of the various fingers 33.

To enable one operating the device to know upon which face of which card to inscribe a particular name, etc., and also to enable one instantly to know which of two exposed card faces is the one to be referred to when the device is opened, it should be helpful for each card face to have, very lightly printed thereon in red or other suitable color and in large type, the letter of the alphabet for which that particular face is reserved.

Although the operation of the device may be comprehended from the foregoing description, nevertheless it should be understood that after original inscriptions have been entered upon the several cards, the cover 21 may be opened by pushing the key 48 upwardly along the inclined plane 39 and then the cards, in their proper sequence, may be deposited in the card holder 14 and the cover 21 closed by pressing the key 48. This is the normal condition of the device as it rests upon a desk, table or other flat surface.

If one wishes to refer to the entry with respect to any given name, as for example, one starting with the letter "G," he merely pushes downwardly the key 31 which is directly above the indicia "GH" appearing on the inclined plane 39 and the device, without any further manipulation, instantly opens to a point at which one of the visible card faces carries the entries with respect to all names starting with the letter "G." The other visible card face carries entries with respect to all names starting with the letter "H." After noting the desired information, the device is instantaneously closed by merely pressing downwardly the key 48 in relation to which the indicia "CLOSE" has been applied to the inclined plane 39.

Generally speaking, each key 31 serves with respect to two letters of the alphabet, but one or two such keys may each serve with respect to three letters where one or several of such letters such as "Q," "X," and "Z" rarely occur as first letters of names. Of course, thirteen cards and card actuators could be provided so that a separate card face would be reserved for each letter of the alphabet or to permit such a distribution of the alphabet among the cards as would allot more listing space to the most used letters.

As illustrated and described herein the various cards 16 are not locked into the device. This makes it possible to instantaneously lift out all cards and deposit a new rewritten set of cards in place or to instantaneously lift out one card to inscribe an entry thereon and then re-deposit that card in the device. Within the invention, however, the cards may be fastened into the device if desired.

The device may be very economically produced for all the card actuators are identical in all respects and may be molded in plastic material in large volume at an extremely low cost. The base and the card holder possibly could be molded of plastic in one piece but in any event each of these parts could be molded in one piece. The presence of only two pivot structures also minimizes production costs and the assembly of the device, although a hand job, can be done very quickly, thus minimizing that part of the cost. One familiar with production engineering undoubtedly will perceive other features minimizing the cost of producing the device. As a matter of economy, also, the spring return arrangement for the card actuators may be completely omitted without materially impairing the operating efficiency of the device.

Although the device as illustrated and described is shown with only a calendar and scratch paper receptacle associated therewith, it is obviously of such attractive and efficient design that it could serve as a central implement of one's desk and could also have directly associated or integrated with it one or more of such devices as a pen and pencil holder, a desk lamp, and a clock. In any event, as illustrated, it brings together three things which one must frequently use or refer to when using a telephone.

It should be apparent that the present invention achieves all its stated objects in a very simple, effective and convenient manner; also that the inventive concept may be utilized in various ways other than shown and described herein. Therefore, the scope of this invention is not to be unduly limited but is to be given effect to the full extent permitted by the language of the following claims.

I claim:

1. A card indexing device comprising a card holder, and card-actuating means, the latter comprising a card actuating finger guided with respect to said holder for horizontal movement forwardly to engage and actuate a card in the holder, a fixed surface associated with said holder and inclined downwardly toward the front of the device, a member movable manually downwardly and forwardly upon the inclined surface, and means interconnecting said member and finger for transmitting to the latter the forward component of such movement.

2. In a card indexing device, the combination of selective opening means for moving any selected one or more of plural cards in the device angularly about horizontal axes from more nearly vertical than horizontal, upright closed positions to substantially horizontal open positions, and closing means for moving such selected card or cards angularly back to their said upright closed positions; the said closing means comprising a pivotal plate disposed in the path of the opening movement of such selected card or cards and adapted to similarly move angularly freely therewith from a similar, more nearly vertical than horizontal, upright position to a substantially horizontal attitude with the selected card or cards resting thereon, and plate-actuating means coacting with said plate and including a movable element having a key remote from said plate and manually operable, independently of said selective opening means and irrespective of which card or cards have been moved to their open positions upon said plate, for pivoting the latter and any card or cards thereon upwardly to their respective mentioned upright positions.

3. In a card indexing device, the combination according to claim 2, the closing means including a pitman fixed to said plate and the mentioned manually operable key being operatively associated with said pitman.

4. In a card indexing device, the combination according to claim 2, the closing means further comprising a fixed inclined surface, on the device, the said key being movable manually downwardly upon said surface, and means coacting with said key and the mentioned plate for pivoting the latter.

5. A card indexing device comprising plural elements selectively movable horizontally in coaction with a card or cards for imparting movement to the latter relatively to another card or cards, a fixed inclined surface, and plural manually movable members, movable downwardly upon said surface, each of said members being related to and coacting with a different one of said elements for communicating its horizontal component of such movement to its related element.

6. A card indexing device comprising a plurality of selectively and horizontally movable card actuating elements each adapted to coact with a different card to move the latter to an open position and a horizontally movable element adapted to coact with one or more cards to move the latter to closed positions, a portion having an inclined surface and plural slots therein extending downwardly with respect to the inclined surface and each having a different one of the mentioned elements extending therethrough, the said elements each having an integral manually operable portion overlying the inclined surface and of such thickness as to be incapable of passing through its related slot and being movable down the inclined surface to impart horizontal movement to its related element.

7. In a card indexing device having plural similar movable shouldered card actuators in side by side relationship, means for yieldably urging said actuators in one direction comprising a floating crossbar, supported by said actuators, and extending transversely of and in engagement with similar shoulders in all the card actuators, and spring means coacting with the crossbar to hold the latter in its said position and to urge it laterally in the said direction together with all said actuators.

8. A card indexing device according to claim 1, further characterized in that the said interconnecting means comprise a shank which is rigidly associated with said manually movable member and with said finger.

9. A card indexing device comprising card supporting means having a bottom support with a bottom, card supporting surface upon which plural cards may rest on their bottom edges in similar upright positions, and a side supporting member, above and to one side of said bottom support, against which such edgewisely supported cards may lean, and plural card actuating members normally positioned in spaced, side-by-side relationship in line at said one side and separately movable approximately horizontally in lines extending transversely of and through the areas occupied by such upright, leaning cards in the face planes of the latter and to an extent enabling said actuating members to engage such cards and push them angularly toward the other side of said bottom support, beyond vertical planes which include the bottom edges of such cards.

10. A card indexing device according to claim 9, the said card actuating members being similar and positioned slightly above said bottom, card supporting surface at such a level that their lines of horizontal movement correspond to the level of bottom marginal portions of such upright cards, the device, further, including means, coacting with portions of such cards which are below the lines of movement of said actuating members, for opposing translation movement of such cards when the latter are pushed at their said bottom marginal portions by said actuating members.

11. A card indexing device comprising a plurality of notched cards having selecting portions at different positions thereon; means for supporting said cards including a bottom, card supporting surface upon which said cards may rest on their bottom edges in similar, upright closed positions, a back support, disposed above and rearwardly of said bottom, card supporting surface, against which said cards may lean when thus uprightly supported, and a front support, disposed forwardly of said bottom, card supporting surface and adapted to support said cards in approximately horizontal open positions; and separate card actuating members for each of said cards, normally positioned rearwardly of said bottom, card supporting surface and each being separately movable, manually, in a line of movement extending through notches in one or more cards other than its related card and intersecting the selecting portion of its related card when the cards are in said upright positions; the said movement of each actuating member being of sufficient extent to enable it to engage the selecting portion of its related card when the latter is thus uprightly positioned and push forwardly, through vertical positions, its said related card and any uprightly positioned cards disposed forwardly thereof to enable said card or cards to gravitate to their said open positions.

ROBERT HENDERSON.

REFERENCES CITED

The following references are of record in the file of this patent:

UNITED STATES PATENTS

| Number | Name | Date |
|---|---|---|
| 513,343 | Schuyler | Jan. 23, 1894 |
| 647,218 | Christiansen | Apr. 10, 1900 |
| 700,906 | Edwards | May 27, 1902 |
| 834,294 | Gremple | Oct. 30, 1906 |
| 854,110 | Schultz et al. | May 21, 1907 |
| 856,841 | Birnbach | June 11, 1907 |
| 1,069,122 | Friedman | Aug. 5, 1913 |
| 1,531,429 | Weis | Mar. 31, 1925 |
| 1,543,599 | Chester | June 23, 1925 |
| 2,329,300 | Rummler | Sept. 14, 1943 |